(12) United States Patent
Zhou et al.

(10) Patent No.: US 9,520,710 B2
(45) Date of Patent: Dec. 13, 2016

(54) THERMAL TRIP ASSEMBLY AND CIRCUIT INTERRUPTER INCLUDING THE SAME

(71) Applicant: EATON CORPORATION, Cleveland, OH (US)

(72) Inventors: Xin Zhou, Moon Township, PA (US); Gerald Zheng, Shenzhen (CN); Olina Ouyang, Shenzhen (CN); Bruce Wu, Shenzhen (CN); Jack Gu, Shanghai (CN)

(73) Assignee: EATON CORPORATION, Cleveland, OH (US)

( * ) Notice: Subject to any disclaimer, the term of this patent is extended or adjusted under 35 U.S.C. 154(b) by 227 days.

(21) Appl. No.: 14/312,917

(22) Filed: Jun. 24, 2014

(65) Prior Publication Data
US 2015/0372478 A1 Dec. 24, 2015

(51) Int. Cl.
| | |
|---|---|
| *H02H 5/04* | (2006.01) |
| *G01K 13/00* | (2006.01) |
| *G01K 7/01* | (2006.01) |
| *G01K 1/14* | (2006.01) |
| *G01K 1/18* | (2006.01) |
| *H01H 71/12* | (2006.01) |
| *H01H 71/22* | (2006.01) |
| *H01H 11/00* | (2006.01) |

(52) U.S. Cl.
CPC ............... *H02H 5/048* (2013.01); *G01K 7/01* (2013.01); *G01K 13/00* (2013.01); *H02H 5/041* (2013.01); *H02H 5/044* (2013.01); *G01K 1/143* (2013.01); *G01K 1/18* (2013.01); *H01H 71/125* (2013.01); *H01H 71/22* (2013.01); *H01H 2011/0068* (2013.01); *H01H 2071/124* (2013.01)

(58) Field of Classification Search
CPC ........ H02H 5/041; H02H 5/044; H02H 5/048; G01K 7/01
See application file for complete search history.

(56) References Cited

U.S. PATENT DOCUMENTS

| | | | |
|---|---|---|---|
| 3,477,290 A * | 11/1969 | Lerner | ............... G01F 23/268 361/284 |
| 4,428,022 A | 1/1984 | Engel et al. | |
| 5,525,985 A | 6/1996 | Schlotterer et al. | |

(Continued)

FOREIGN PATENT DOCUMENTS

| | | |
|---|---|---|
| EP | 1 535 383 A2 | 6/2005 |
| EP | 1 939 998 A2 | 7/2008 |
| JP | H06 139912 A | 5/1994 |

OTHER PUBLICATIONS

European Patent Office, "International Search Report and Written Opinion for PCT/US2015/028147", Aug. 4, 2015, 11 pp.

*Primary Examiner* — Thienvu Tran
*Assistant Examiner* — Tien Mai
(74) *Attorney, Agent, or Firm* — Eckert Seamans; Nathaniel Wilks; Grant Coffield

(57) ABSTRACT

A thermal trip assembly for use with a busbar includes a fastener, an insulating sleeve, a temperature sensor structured to sense a temperature of the busbar, and a thermal trip circuit structured to output a trip signal based on the sensed temperature. A portion of the insulating sleeve is disposed between the temperature sensor and the busbar. The fastener couples the insulating sleeve and the temperature sensor to the busbar with the insulating sleeve being in direct contact with a portion of the busbar.

22 Claims, 6 Drawing Sheets

(56) References Cited

U.S. PATENT DOCUMENTS

| | | | |
|---|---|---|---|
| 5,910,760 | A | 6/1999 | Malingowski et al. |
| 6,144,271 | A | 11/2000 | Mueller et al. |
| 6,707,652 | B2 | 3/2004 | Engel |
| 6,948,846 | B2 | 9/2005 | Engel |
| 7,148,696 | B2 | 12/2006 | Zhou et al. |
| 7,292,154 | B1 | 11/2007 | Baier et al. |
| 7,400,225 | B2 | 7/2008 | Shea |
| 7,403,129 | B2 | 7/2008 | Zhou et al. |
| 7,411,403 | B2 | 8/2008 | Zhou |
| 7,684,164 | B2 | 3/2010 | Wong et al. |
| 7,806,736 | B2 | 10/2010 | Alderson et al. |
| 7,808,760 | B2 | 10/2010 | Kopelman |
| 7,847,562 | B2 | 12/2010 | Montgomery et al. |
| 7,909,664 | B2 | 3/2011 | Ilkhanov |
| 7,963,812 | B2 | 6/2011 | Ilkhanov |
| 8,047,883 | B2 | 11/2011 | Montalbano et al. |
| 8,137,145 | B2 | 3/2012 | Joy |
| 8,139,337 | B2 | 3/2012 | Baxter et al. |
| 8,152,372 | B1 * | 4/2012 | Peng ............... G01K 15/00 327/512 |
| 8,159,803 | B2 | 4/2012 | Ward et al. |
| 2003/0202305 | A1 | 10/2003 | Engel et al. |
| 2004/0145844 | A1 | 7/2004 | Franke et al. |
| 2007/0104988 | A1 * | 5/2007 | Nishii ............... C09K 5/063 252/70 |
| 2008/0013596 | A1 * | 1/2008 | Dunne ............... G01K 1/14 374/152 |
| 2012/0194344 | A1 * | 8/2012 | McNamara ......... H02J 13/00 340/584 |
| 2012/0251849 | A1 * | 10/2012 | Park ............... H01M 2/105 429/7 |
| 2013/0043967 | A1 * | 2/2013 | Rouaud ............ G01R 15/181 336/200 |
| 2014/0078633 | A1 | 3/2014 | Zhou |

* cited by examiner

THERMAL TRIP ASSEMBLY AND CIRCUIT INTERRUPTER INCLUDING THE SAME

CROSS-REFERENCE TO RELATED APPLICATION

This application is related to co-pending U.S. patent application Ser. No. 14/312,994 filed on Jun. 24, 2014, entitled "Circuit Interrupter Including Thermal Trip Assembly and Printed Circuit Board Rogowski Coil", the entirety of which is incorporated herein by reference.

BACKGROUND

Field

The disclosed concept relates generally to circuit interrupters, and in particular, to temperature based trip mechanisms and circuit interrupters including temperature based trip mechanisms.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of an operator handle or automatically in response to a detected fault condition. Typically, such circuit breakers include an operating mechanism, which is designed to rapidly open and close the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

Fault conditions in circuit breakers are generally detected either by sensing the current flowing through the protected circuit or by sensing the temperature of conductors in the circuit breaker. Circuit breakers generally employ a mechanism such as an electronic trip unit or a magnetic trip unit to initiate a trip based on the current flowing through the protected circuit. Trips initiated by an electronic trip unit or magnetic trip unit are usually either instantaneous or initiated after a predetermined delay.

To initiate trips based on the temperature of conductors in the circuit breaker, circuit breakers have employed bi-metal based mechanisms. More particularly, current in the protected circuit flows through a bi-metal material device in the circuit breaker causing the temperature of the bi-metal to increase. As the temperature of the bi-metal increases, the bi-metal bends. Once the bi-metal bends a sufficient amount, a mechanism is triggered, such as a latch being released, which initiates a trip.

Temperature based trips are generally caused by a sustained overcurrent condition in the protected circuit which causes the conductors in the protected circuit to increase in temperature. However, it is difficult to precisely control the amount of time and the amount of current needed to initiate a temperature based trip. It is particularly difficult to calibrate bi-metal based trip mechanisms which can vary significantly in their performance.

U.S. Patent Application Publication No. 2014/0078633 discloses a temperature sensor used in conjunction with an electronic trip unit to provide temperature based trips. However, placement of the temperature sensor remains a concern as placing a temperature sensor directly against a conductor can damage the temperature sensor while placing the temperature sensor proximate to the conductor can cause a time lag between the temperature sensor readings and the actual temperature of the conductor.

There is room for improvement in circuit interrupters.

There is room for improvement in temperature based trip mechanisms.

SUMMARY

These needs and others are met by embodiments of the disclosed concept in which a thermal trip assembly for use with a busbar includes a temperature sensor and an insulating sleeve. These needs and others are also met by embodiments of the disclosed concept in which a circuit interrupter includes the thermal trip assembly.

In accordance with one aspect of the disclosed concept, a thermal trip assembly for use with a busbar comprises: a fastener; an insulating sleeve; a temperature sensor structured to sense a temperature of the busbar; and a thermal trip circuit structured to output a trip signal based on the sensed temperature, wherein a portion of the insulating sleeve is disposed between the temperature sensor and the busbar; and wherein the fastener couples the insulating sleeve and the temperature sensor to the busbar with the insulating sleeve being in direct contact with a portion of the busbar.

In accordance with another aspect of the disclosed concept, a circuit interrupter comprises: a first terminal; a second terminal; a plurality of busbars electrically connecting the first and second terminals; separable contacts moveable between a closed position and an open position, the first and second terminals being electrically disconnected from each other when the separable contacts are in the open position; an operating mechanism structured to open the separable contacts; an actuator structured to cooperate with the operating mechanism to trip open the separable contacts; a current sensor structured to sense a current flowing between the first and second terminals; a current transformer structured to harvest power from the current flowing between the first and second terminals; an electronic trip unit including an other trip function circuit structured to output a first trip signal to control the actuator to cooperate with the operating mechanism to trip open the separable contacts based on the current sensed by the current sensor and a thermal trip assembly comprising: a fastener; an insulating sleeve; a temperature sensor structured to sense a temperature of one of the plurality of busbars; and a thermal trip circuit structured to output a second trip signal based on the sensed temperature, wherein a portion of the insulating sleeve is disposed between the temperature sensor and the one of the plurality of busbars; and wherein the fastener couples the insulating sleeve and the temperature sensor to the one of the plurality of busbars with the insulating sleeve being in direct contact with a portion of the one of the plurality of busbars.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
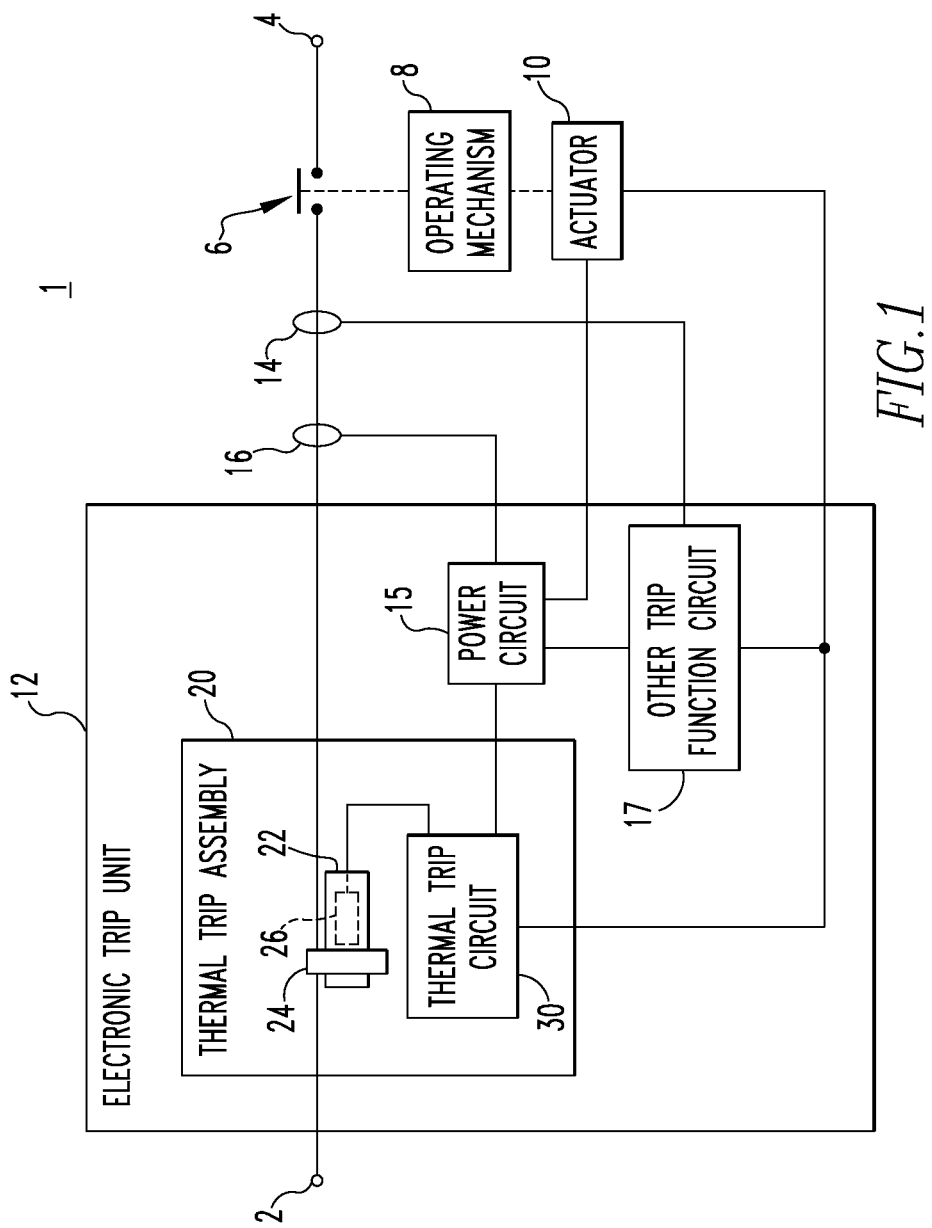
FIG. 1 is a circuit diagram in schematic form of a circuit interrupter in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

In FIG. 1, a circuit interrupter 1 includes first and second terminals 2,4 electrically connected by electrical conductors such as busbars or other suitable electrical conductors. The circuit interrupter 1 further includes separable contacts 6 electrically connected between the first and second terminals 2,4. The separable contacts 6, when closed, allow electrical current to flow between the first and second terminals 2,4. When the separable contacts 6 open, the electrical connection between the first and second terminals 2,4 is broken and electrical current is unable to flow between them. An operating mechanism 8 included in the circuit interrupter 1 is structured to open or close the separable contacts 6. An actuator 10, also included in the circuit interrupter 1, is structured to cooperate with the operating mechanism 8 to cause the operating mechanism 8 to open or close the separable contacts 6.

The circuit interrupter 1 also includes an electronic trip unit 12. The electronic trip unit 12 includes an other trip function circuit 17 which is electrically connected to a current sensor 14 (e.g., without limitation, a Rogowski coil) that senses current flowing between the first and second terminals 2,4. The other trip function circuit 17 is structured to control the actuator 10 to initiate a trip based on the sensed current flowing between the first and second terminals 2,4.

The electronic trip unit 12 also includes a power circuit 15. The power circuit 15 is electrically connected to a current transformer 16 that is structured to harvest power from the current flowing between the first and second terminals 2,4. The power circuit 15 is structured to condition the harvested power so that it can be provided to various components in the circuit interrupter 1.

Figure 5:
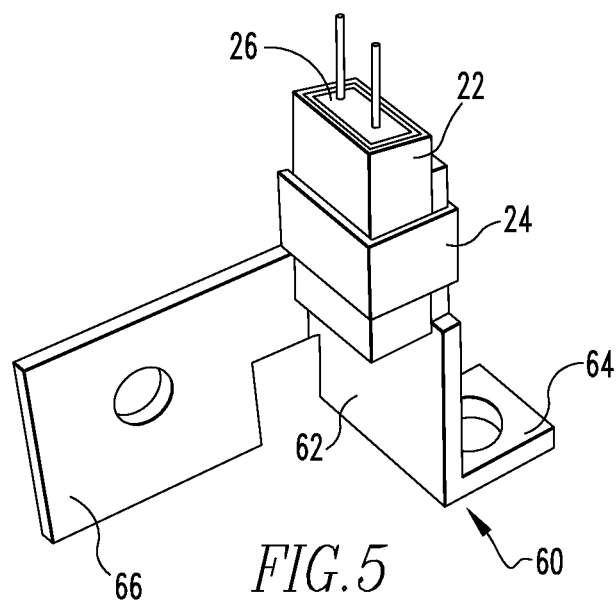
FIG. 5 is a isometric view of a busbar in accordance with an example embodiment of the disclosed concept.
Figure 6:
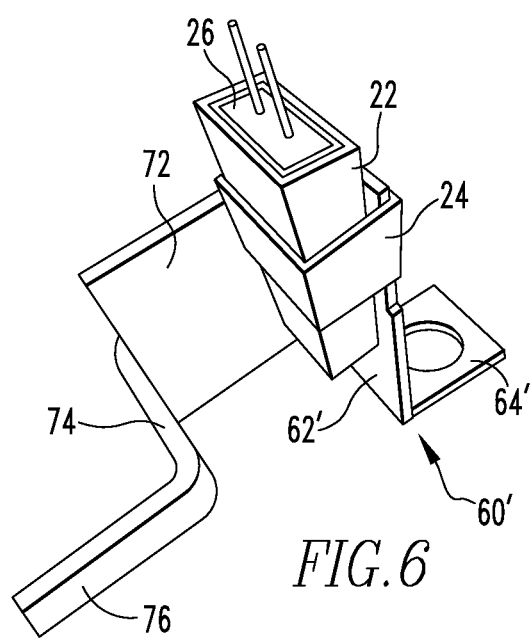
FIG. 6 is an isometric view of another busbar in accordance with another example embodiment of the disclosed concept.

A thermal trip assembly 20 included in the electronic trip unit 12 is structured to sense the temperature of a conductor (e.g., without limitation, a busbar, such as the example busbars 60,60' of respective FIGS. 5 and 6) electrically connected between the first and second terminals 2,4, and to initiate a trip based on the sensed temperature. The thermal trip assembly 20 includes an insulating sleeve 22 and a fastener 24 that is structured to couple the insulating sleeve 22 to the conductor so that it is in direct contact with the conductor. A temperature sensor 26 (e.g., without limitation, a thermal diode) is fitted inside the insulating sleeve 22 so that the insulating sleeve 22 is disposed between the temperature sensor 26 and the conductor. The temperature sensor 26 is structured to sense temperature and to output an electrical signal based on the sensed temperature.

The insulating sleeve 22 is made of material that has good electrical insulating characteristics. The insulating sleeve 22 also has suitably high thermal conductivity and suitably low thermal capacitance. The thermal conductivity and thermal capacitance characteristics of the insulating sleeve allow the temperature sensor 26 to quickly and accurately sense the temperature of the conductor. In some example embodiments of the disclosed concept, the insulating sleeve 22 is made of a thermal silicone material. In some other example embodiments of the disclosed concept, the insulating sleeve 22 is made of a silicone rubber based material such as, without limitation, silicone rubber with ceramic filler. However, it will be appreciated by those having ordinary skill in the art that the disclosed concept is not limited thereto. Any material having suitable thermal conductivity and suitable thermal capacitance characteristics may be used in the insulating sleeve 22. In some example embodiments of the disclosed concept the insulating sleeve 22 has a thermal conductivity in a range of about 1.2 W/mK to about 1.8 W/mK and a specific heat capacity in a range of about 1.05 kJ/kgK to about 1.3 kJ/kgK.

Although the disclosed fastener 24 is a clip, it will be appreciated by those having ordinary skill in the art that any type of fastener suitable for coupling the insulating sleeve 22 to the conductor may be employed without departing from the scope of the disclosed concept.

Figure 3:
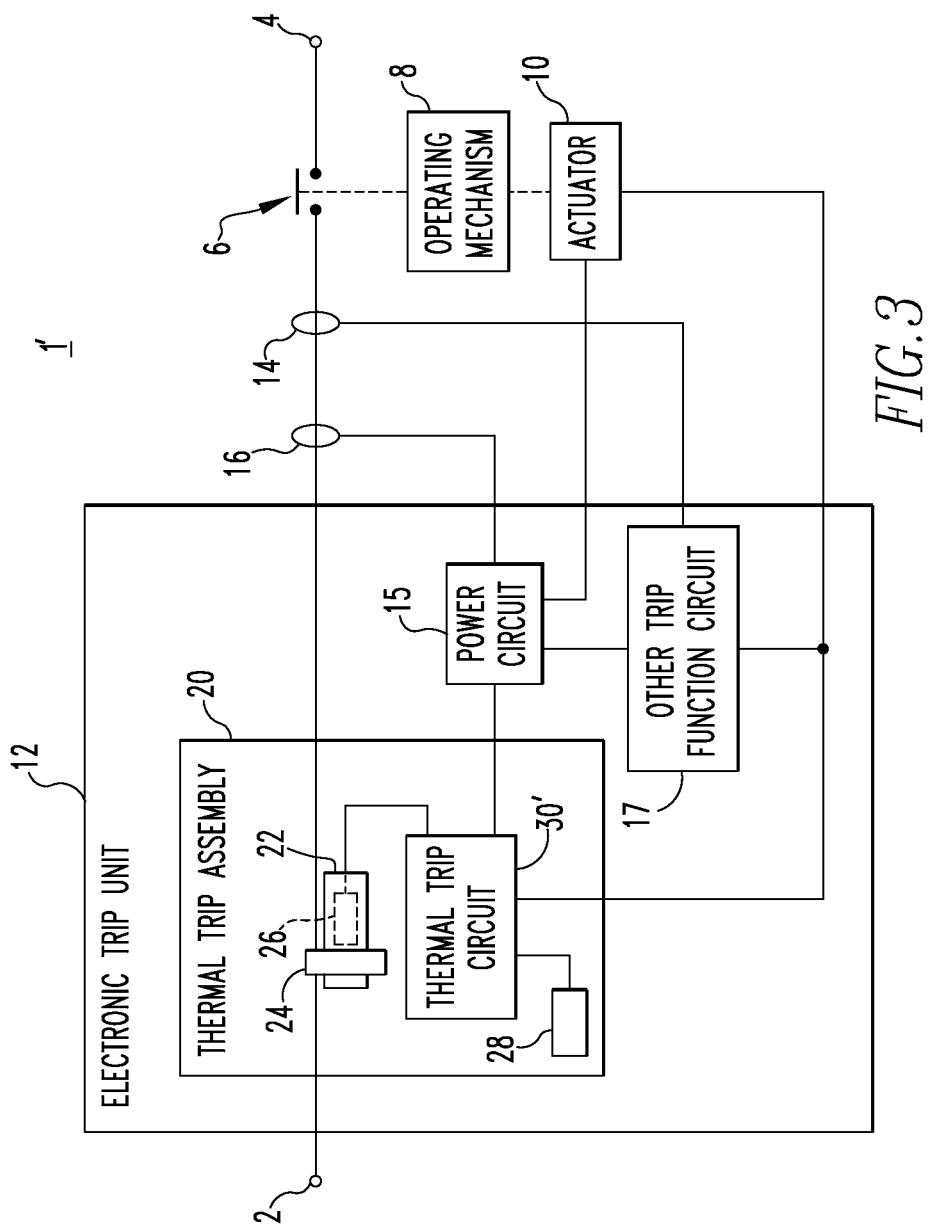
FIG. 3 is a circuit diagram in schematic form of a circuit interrupter including an ambient temperature sensor in accordance with an embodiment of the disclosed concept.

In addition to the temperature sensor 26, the thermal trip assembly 20 may also include an ambient temperature sensor 28 (FIG. 3). The ambient temperature sensor 28 senses temperature similar to the temperature sensor 26. However, the ambient temperature sensor 28 is disposed at a position away from the conductor so as to sense the ambient temperature inside the circuit interrupter 1. It will be appreciated by those having ordinary skill in the art that the ambient temperature sensor 28 may be omitted without departing from the scope of the disclosed concept.

The temperature sensor 26 and the optional ambient temperature sensor 28 (FIG. 3), if employed, are both electrically connected to the thermal trip circuit 30. The thermal trip circuit 30 is structured to control the actuator 10 to initiate a trip based on the sensed temperatures of the temperature sensor 26 and the ambient temperature sensor 28. The thermal trip circuits 30,30' will be described in more detail with reference to FIGS. 2-4.

Figure 2:
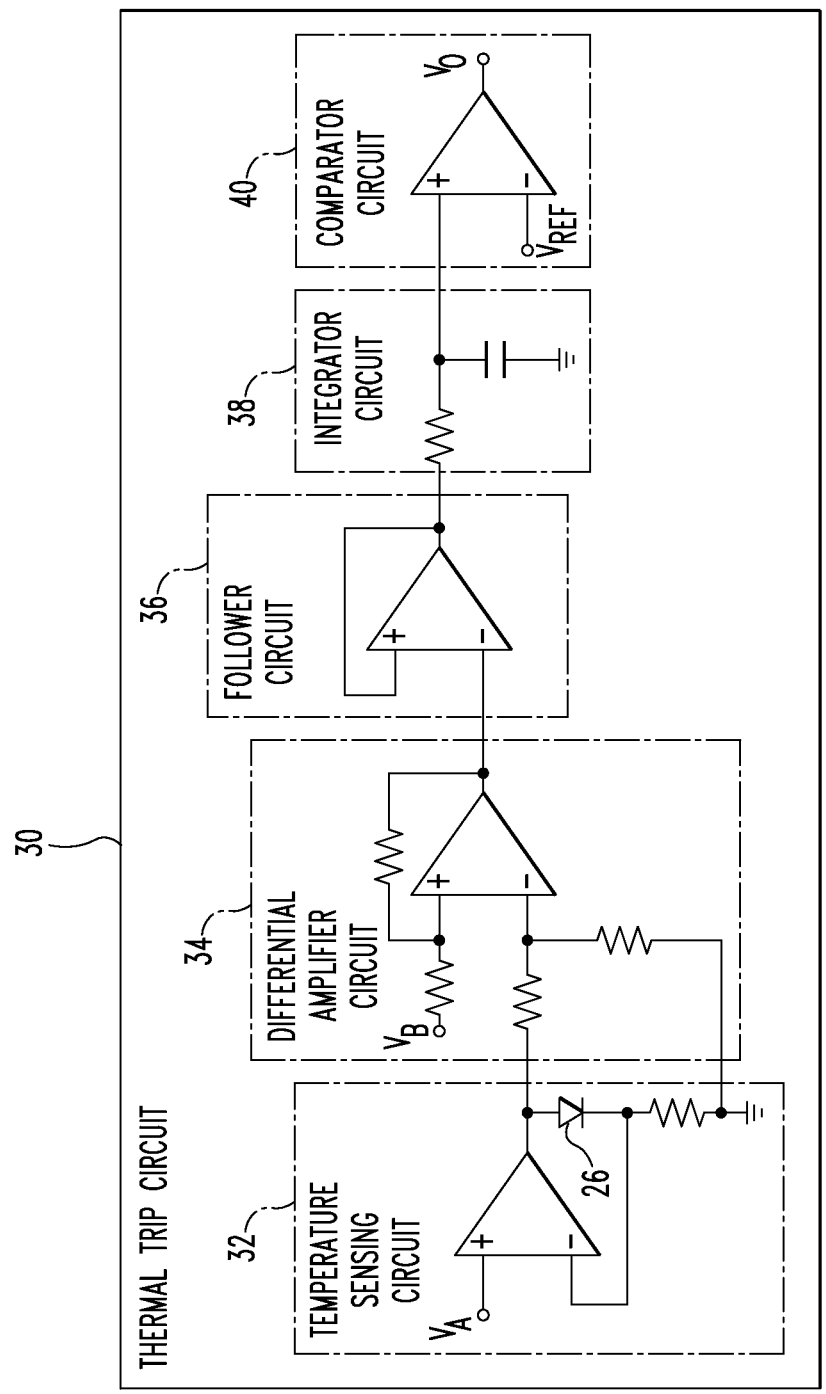
FIG. 2 is a circuit diagram of a thermal trip circuit in accordance with an example embodiment of the disclosed concept.

FIG. 2 is an example of the thermal trip circuit 30 when the thermal trip assembly 20 (FIG. 1) does not include the ambient temperature sensor 28. The thermal trip circuit 30 includes a temperature sensing circuit 32, a differential amplifier circuit 34, a follower circuit 36, an integrator circuit 38, and a comparator circuit 40.

The temperature sensing circuit 32 is electrically connected to the temperature sensor 26, which is represented as an example diode in FIG. 2. The temperature sensing circuit 32 uses a first constant voltage $V_A$ and an operational amplifier to provide a constant current to the temperature sensor 26. A voltage across the temperature sensor 26 varies based on the temperature sensed by the temperature sensor 26, and thus the voltage at the output of the temperature sensing circuit 32 also varies by the same amount.

The differential amplifier circuit 34 is structured to amplify the difference between the output of the temperature sensing circuit 32 and a second constant voltage $V_B$. The follower circuit 36 is structured to act as a buffer between the differential amplifier circuit 34 and the integrator circuit 38. The integrator circuit 38 includes a resistance and a capacitance arranged as an integrator. The integrator circuit 38 is structured to smooth any alternating current components of the output of the follower circuit 36.

The comparator circuit 40 is electrically connected to the output of the integrator circuit 38. The comparator circuit 40 is structured to compare the output of the integrator circuit 38 with a reference voltage $V_{REF}$. When the output of the integrator circuit 38 exceeds the reference voltage $V_{REF}$, the comparator circuit 40 outputs an output voltage $V_O$. The output voltage $V_O$ is used to control the actuator 10 to initiate a trip.

The constant voltages $V_A, V_B$, the reference voltage $V_{REF}$, and the resistances and capacitances of the components in the thermal trip circuit 30 may be selected in order that the thermal trip circuit 30 controls the actuator 10 to initiate a trip when the temperature of the conductor exceeds a predetermined level. The values may be determined experimentally, theoretically, or any suitable combination thereof.

The thermal trip assembly 20 has lower performance variation than bi-metal based thermal trip units. Furthermore, the thermal trip assembly 20 is easier to calibrate and has more flexibility in trip performance setting adjustment than bi-metal based thermal trip units. The calibration of the electronic trip unit 12 can be achieved by adjusting the $V_{REF}$ value through a variable resistor in the circuit.

Referring to FIG. 3, a circuit interrupter 1' in accordance with an example embodiment of the disclosed concept includes similar components as the circuit interrupter 1 of FIG. 1. However, the circuit interrupter 1' of FIG. 3 includes a thermal trip assembly 20' that also includes the ambient temperature sensor 28. The ambient temperature sensor 28 is similar to the temperature sensor 26. However, the ambient temperature sensor 28 is disposed away from the conductor and is structured to sense the ambient temperature inside the circuit interrupter 1'. The ambient temperature sensor 28 is electrically connected to the thermal trip circuit 30'. The thermal trip circuit 30' of FIG. 3 is similar to the thermal trip circuit 30 of FIG. 1, except that the thermal trip circuit 30' of FIG. 3 includes additional circuitry associated with the ambient temperature sensor 28.

Figure 4:
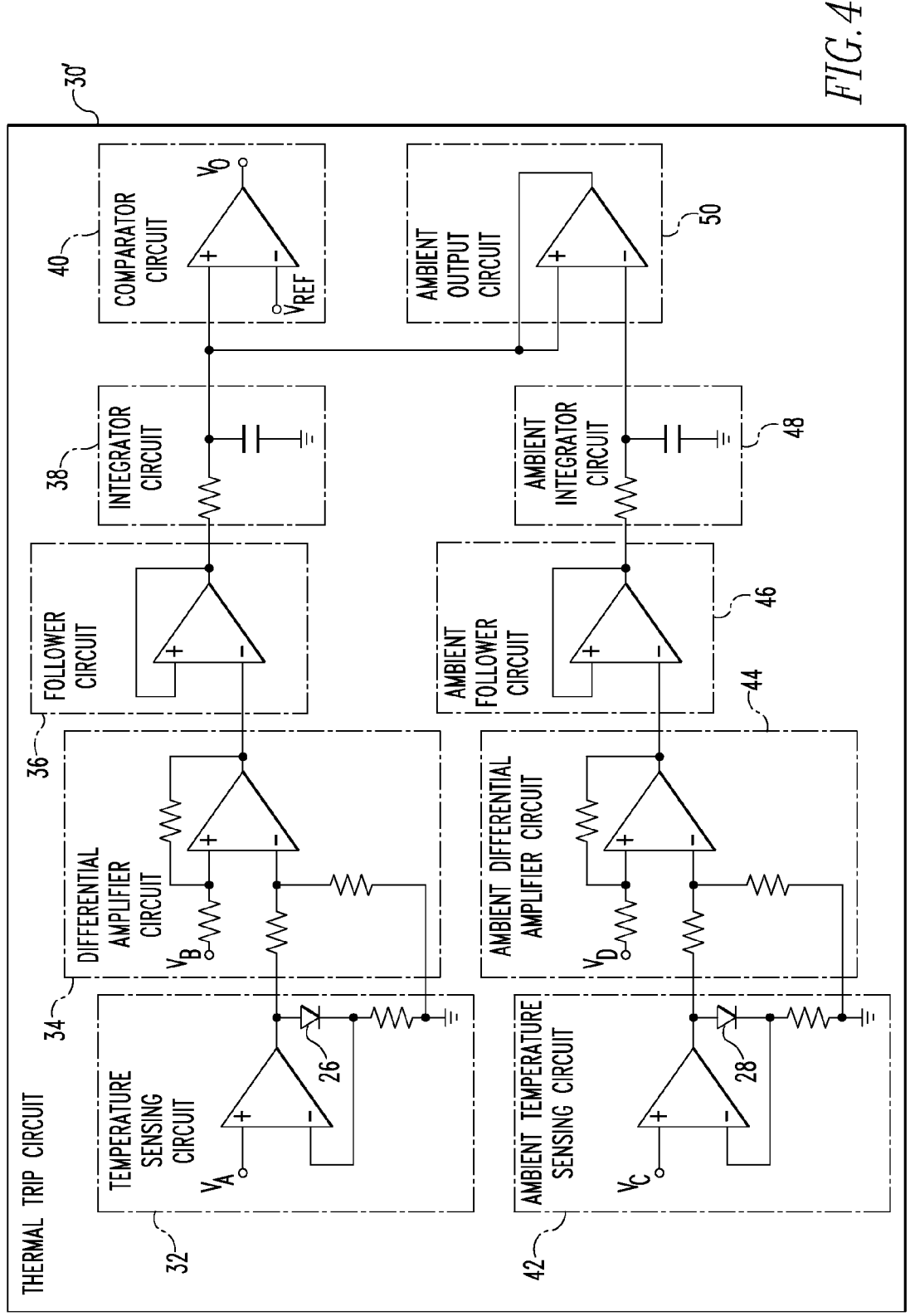
FIG. 4 is a circuit diagram of a thermal trip circuit including circuitry associated with an ambient temperature sensor in accordance with an example embodiment of the disclosed concept.

As shown in FIG. 4, the thermal trip circuit 30' includes the temperature sensing circuit 32, the differential amplifier circuit 34, the follower circuit 36, and the integrator circuit 38 associated with the temperature sensor 26. The thermal trip circuit 30' also includes an ambient temperature sensing circuit 42, an ambient differential amplifier circuit 44, an ambient follower circuit 46, an ambient integrator circuit 48, and an ambient output circuit 50 that are associated with the ambient temperature sensor 28.

In more detail, the ambient temperature sensing circuit 42 is electrically connected to the ambient temperature sensor 28, which is represented as an example diode in FIG. 4. The ambient temperature sensing circuit 42 uses a third constant voltage $V_C$ and an operational amplifier to provide a constant current to the ambient temperature sensor 28. A voltage across the ambient temperature sensor 28 varies based on the temperature sensed by the ambient temperature sensor 28, and thus the voltage at the output of the ambient temperature sensing circuit 42 also varies by the same amount.

The ambient differential amplifier circuit 44 is structured to amplify the difference between the output of the ambient temperature sensing circuit 42 and a fourth constant voltage $V_D$. The ambient follower circuit 46 is structured to act as a buffer between the ambient differential amplifier circuit 44 and the ambient integrator circuit 48. The ambient integrator circuit 48 includes a resistance and a capacitance arranged as an integrator. The ambient integrator circuit 48 is structured to smooth any transient noises and alternating current components of the output of the ambient follower circuit 46.

The ambient output circuit 50 is electrically connected to the output of the ambient integrator circuit 48 and the input of the comparator circuit 40. The ambient output circuit 50 is structured to function as a buffer between the ambient integrator circuit 48 and the comparator circuit 40.

The comparator circuit 40 is electrically connected to the output of the integrator circuit 38 and the output of the ambient output circuit 50. The output of the ambient output circuit 50 is subtracted from the output of the integrator circuit 38 at the input of the comparator circuit 40. The comparator circuit 40 compares the resultant voltage with a reference voltage $V_{REF}$. When the input of the comparator circuit 40 exceeds the reference voltage $V_{REF}$, the comparator circuit 40 outputs an output voltage $V_O$. The output voltage $V_O$ is used to control the actuator 10 to initiate a trip.

The constant voltages $V_A, V_B, V_C, V_D$, the reference voltage $V_{REF}$, and the resistances and capacitances of the components in the thermal trip circuit 30' may be selected in order that the thermal trip circuit 30' controls the actuator 10 to initiate a trip when the temperature of the conductor exceeds a predetermined level. The values may be determined experimentally, theoretically, or any suitable combination thereof. By including the ambient temperature sensor 28 and associated circuitry in the thermal trip assembly 20', the ambient temperature of the circuit interrupter 1' can be accounted for when determining whether to initiate a trip. It is particularly useful to account for the ambient temperature when the ambient temperature is relatively high. The calibration of the electronic trip unit 12 can be achieved by adjusting the $V_{REF}$ value through a variable resistor in the circuit.

Referring to FIG. 5, an example busbar 60 includes a flat portion 62. The fastener 24 couples the insulating sleeve 22 and temperature sensor 26 to the flat portion 62 of the busbar 60 in order that the insulating sleeve 22 is in direct contact with the flat portion 62 of the busbar 60. The busbar 60 also includes first and second connection portions 64,66. The first connection portion 64 extends from an end of the flat portion 62 in a direction that is substantially perpendicular to the flat portion 62. The second connection portion 66 extends from a side of the flat portion 62 in a direction that is substantially perpendicular to the flat portion 62. The first and second connection portions 64,66 are suitable for electrically connection of the busbar 60 with other busbars.

Referring to FIG. 6, another example busbar 60' includes a flat portion 62'. The fastener 24 couples the insulating sleeve 22 and the temperature sensor 26 to the flat portion 62' of the busbar 60' in order that the insulating sleeve 22 is in direct contact with the flat portion 62' of busbar 60'. The busbar 60' also includes a first connection portion 64' that extends from an end of the flat portion 62' in a direction that is substantially perpendicular to the flat portion 62'. The busbar 60' further includes a plate portion 72 that extends from a side of the flat portion 62' in a direction that is substantially perpendicular to the flat portion 62'. A first end of the plate portion 72 is connected to the side of the flat portion 62', and a second end of the plate portion 72 has a bent portion extending therefrom. The bent portion includes a first portion 74 that extends in a direction substantially perpendicular to the plate portion 72 and a second portion 76 that extends from an end of the first portion 74. The first and second portions 74,76 are substantially perpendicular with each other. The busbar 60' may be electrically connected with other busbars via the first connection portion 64' and the second portion 76 of the bent portion.

Figure 7:
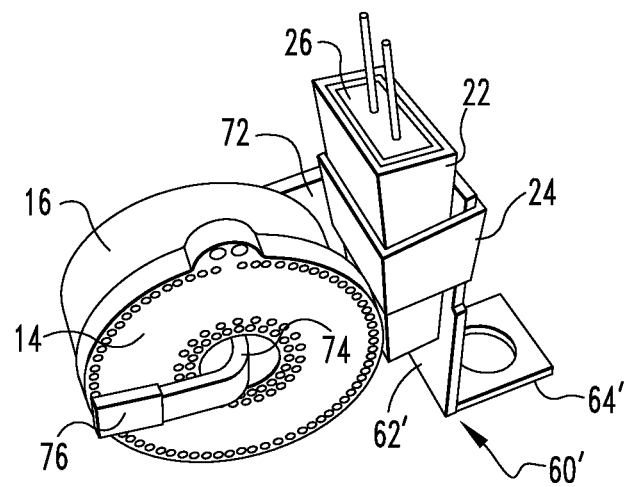
FIG. 7 is an isometric view of the busbar of FIG. 6 with a current transformer and a Rogowski coil installed thereon in accordance with an example embodiment of the disclosed concept.

Referring to FIG. 7, the current sensor 14 and the current transformer 16 are disposed around the bent portion of the busbar 60'. In the example embodiment shown in FIG. 7, the current sensor 14 is a printed circuit board (PCB) Rogowski coil. The PCB Rogowski coil includes a core made of PCB with windings printed thereon, as opposed to an air Rogowski coil which includes a core made of air and windings made of a number of electrical conductors (i.e., wires). The PCB Rogowski coil provides a linear and accurate measurement of the current flowing through the busbar 60'. The PCB Rogowski coil provides more consistent measurements than an air Rogowski coil due to the precise number of turns and repeatability in manufacturing. Also, unlike a current transformer, the PCB Rogowski coil is not susceptible to saturation. In some example embodiments, the Rogowski coil has an outer diameter of about 31 mm, an inner diameter of about 8 mm, and a thickness of about 3.2 mm. In some example embodiments the current transformer 16 has an outer diameter of about 30 mm, and inner diameter of about 8 mm, and a thickness of about 12 mm.

As shown in FIG. 7, the PCB Rogowski coil and current transformer 16 are disposed around the first portion 74 of the bent portion of the busbar 60'. Since the current transformer 16 is not used to sense current, it does not matter if it becomes saturated, and thus a relatively small current transformer 14 can be employed. The busbar 60' including the insulating sleeve 22, temperature sensor 26, current transformer 16, and PCB Rogowski coil together have a relatively small size and can be employed in a circuit interrupter to provide temperature and current sensing, as well as power harvesting, with relatively little modification or size impact to the circuit interrupter.

Figure 8:
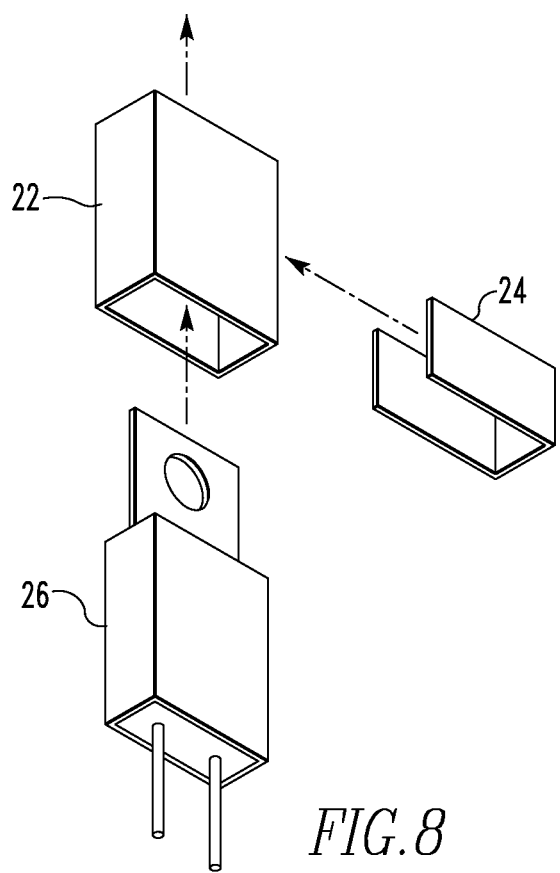
FIG. 8 is an exploded view of an insulating sleeve, a temperature sensor, and a fastener in accordance with an example embodiment of the disclosed concept.

Referring to FIG. 8, the temperature sensor 26 is structured to fit into the insulating sleeve 22. The fastener 24 is then placed around the insulating sleeve 22. The fastener 24 can then be used to couple the insulating sleeve 22 and temperature sensor to a busbar such as, without limitation, any of the busbars 60, 60' shown in FIGS. 5-7.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A thermal trip assembly for use with a busbar, the thermal trip assembly comprising:
    a fastener including a first prong, a second prong, and a central member, wherein the central member is connected to the first prong and the second prong;
    an insulating sleeve;
    a temperature sensor structured to sense a temperature of the busbar; and
    a thermal trip circuit structured to output a trip signal based on the sensed temperature,
    wherein the fastener is structured to couple the thermal trip assembly to the busbar such that the insulating sleeve, the temperature sensor, and the busbar are disposed between the first prong and the second prong when the thermal trip assembly is coupled to the busbar,
    wherein a portion of said insulating sleeve is disposed between the temperature sensor and the busbar when the thermal trip assembly is coupled to the busbar; and
    wherein the insulating sleeve is in direct contact with a portion of the busbar when the thermal trip assembly is coupled to the busbar.

2. The thermal trip assembly of claim 1, wherein the insulating sleeve is composed of thermal silicone material.

3. The thermal trip assembly of claim 1, wherein the insulating sleeve has a thermal conductivity within a range of about 1.2 W/mK to about 1.8 W/mK; and wherein the insulating sleeve has a specific heat capacity within a range of about 1.05 kJ/kgK to about 1.3 kJ/kgK.

4. The thermal trip assembly of claim 1, wherein the temperature sensor is a thermal diode.

5. The thermal trip assembly of claim 1, wherein the thermal trip assembly further includes an ambient temperature sensor disposed apart from the busbar and structured to sense an ambient temperature; and wherein the thermal trip circuit is structured to output the trip signal based on the sensed temperature of the busbar and the sensed ambient temperature.

6. The thermal trip assembly of claim 5, wherein the ambient temperature sensor is a thermal diode.

7. The thermal trip assembly of claim 5, wherein the thermal trip circuit includes:
    a temperature sensing circuit structured to output a voltage based on the temperature sensed by the temperature sensor;
    a differential amplifier circuit structured to amplify to an output a difference between the voltage output by the temperature sensing circuit and a first predetermined voltage;
    a follower circuit structured to buffer to an output a voltage of the output of the differential amplifier circuit;
    an integrator circuit structured to smooth to an output a voltage of the output of the follower circuit;
    an ambient temperature sensing circuit structured to output a voltage based on the ambient temperature sensed by the ambient temperature sensor;
    an ambient differential amplifier circuit structured to amplify to an output a difference between the voltage output by the ambient temperature sensing circuit and a second predetermined voltage;
    an ambient follower circuit structured to buffer to an output a voltage of the output of the ambient differential amplifier circuit;
    an ambient integrator circuit structured to smooth to an output a voltage of the output of the ambient follower circuit;
    an ambient output circuit structured to buffer to an output a voltage of the output of the ambient integrator circuit; and
    a comparator circuit structured to combine a voltage of the outputs of the integrator circuit and the ambient output circuit, to compare a voltage of the combined outputs of the integrator circuit and the ambient output circuit with a third predetermined voltage, and to output the trip signal when the combined outputs of the integrator circuit and the ambient output circuit are greater than the third predetermined voltage.

8. The thermal trip assembly of claim 1, wherein the fastener is a metallic clip.

9. The thermal trip assembly of claim 1, wherein the busbar includes a flat portion; and wherein the insulating sleeve is structured to be in direct contact with the flat portion of the busbar.

10. A thermal trip assembly for use with a busbar, the thermal trip assembly comprising:
a fastener;
an insulating sleeve;
a temperature sensor structured to sense a temperature of the busbar; and
a thermal trip circuit structured to output a trip signal based on the sensed temperature,
wherein a portion of said insulating sleeve is disposed between the temperature sensor and the busbar; and
wherein the fastener couples the insulating sleeve and the temperature sensor to the busbar with the insulating sleeve being in direct contact with a portion of the busbar; and
wherein the thermal trip circuit includes:
a temperature sensing circuit structured to output a voltage based on the temperature sensed by the temperature sensor;
a differential amplifier circuit structured to amplify to an output a difference between the voltage output by the temperature sensing circuit and a first predetermined voltage;
a follower circuit structured to buffer to an output a voltage of the output of the differential amplifier circuit;
an integrator circuit structured to smooth to an output a voltage of the output of the follower circuit; and
a comparator circuit structured to compare a voltage of the output of the integrator circuit with a second predetermined voltage and to output the trip signal when the output of the integrator circuit is greater than the second predetermined voltage.

11. A circuit interrupter comprising:
a first terminal;
a second terminal;
a plurality of busbars electrically connecting the first and second terminals;
separable contacts moveable between a closed position and an open position, the first and second terminals being electrically disconnected from each other when the separable contacts are in the open position;
an operating mechanism structured to open said separable contacts;
an actuator structured to cooperate with said operating mechanism to trip open said separable contacts;
a current sensor structured to sense a current flowing between the first and second terminals;
a current transformer structured to harvest power from the current flowing between the first and second terminals; and
an electronic trip unit including:
an other trip function circuit structured to output a first trip signal to control the actuator to cooperate with the operating mechanism to trip open the separable contacts based on the current sensed by the current sensor; and
a thermal trip assembly comprising:
a fastener including a first prong, a second prong, and a central member, wherein the central member is connected to the first prong and the second prone;
an insulating sleeve;
a temperature sensor structured to sense a temperature of one of the plurality of busbars; and
a thermal trip circuit structured to output a second trip signal based on the sensed temperature,
wherein the fastener is structured to couple the thermal trip assembly to the said one of the plurality of busbars such that the insulating sleeve, the temperature sensor, and said one of the plurality of busbars are disposed between the first prong and the second prong when the thermal trip assembly is coupled to said one of the plurality of busbars;
wherein a portion of said insulating sleeve is disposed between the temperature sensor and said one of the plurality of busbars when the thermal trip assembly is coupled to said one of the plurality of busbars; and
wherein the insulating sleeve is in direct contact with a portion of said one of the plurality of busbars when the thermal trip assembly is coupled to said one of the plurality of busbars.

12. The circuit interrupter of claim 11, wherein the insulating sleeve is composed of thermal silicone material.

13. The circuit interrupter of claim 11, wherein the insulating sleeve has a thermal conductivity within a range of about 1.2 W/mK to about 1.8 W/mK; and wherein the insulating sleeve has a specific heat capacity within a range of about 1.05 kJ/kgK to about 1.3 kJ/kgK.

14. The circuit interrupter of claim 11, wherein the temperature sensor is a thermal diode.

15. The circuit interrupter of claim 11, wherein the thermal trip assembly further includes an ambient temperature sensor disposed apart from the plurality of busbars and structured to sense an ambient temperature; and wherein the thermal trip circuit is structured to output the second trip signal based on the sensed temperature of the one of the plurality of busbars and the sensed ambient temperature.

16. The circuit interrupter of claim 15, wherein the ambient temperature sensor is a thermal diode.

17. The circuit interrupter of claim 15, wherein the thermal trip circuit includes:
a temperature sensing circuit structured to output a voltage based on the temperature sensed by the temperature sensor;
a differential amplifier circuit structured to amplify to an output a difference between the voltage output by the temperature sensing circuit and a first predetermined voltage;
a follower circuit structured to buffer to an output a voltage of the output of the differential amplifier circuit;
an integrator circuit structured to smooth to an output a voltage of the output of the follower circuit;
an ambient temperature sensing circuit structured to output a voltage based on the ambient temperature sensed by the ambient temperature sensor;
an ambient differential amplifier circuit structured to amplify to an output a difference between the voltage output by the ambient temperature sensing circuit and a second predetermined voltage;

an ambient follower circuit structured to buffer to an output a voltage of the output of the ambient differential amplifier circuit;

an ambient integrator circuit structured to smooth to an output a voltage of the output of the ambient follower circuit;

an ambient output circuit structured to buffer to an output a voltage of the output of the ambient integrator circuit; and a comparator circuit structured to combine a voltage of the outputs of the integrator circuit and the ambient output circuit, to compare a voltage of the combined outputs of the integrator circuit and the ambient output circuit with a third predetermined voltage, and to output the second trip signal when the combined outputs of the integrator circuit and the ambient output circuit are greater than the third predetermined voltage.

18. The circuit interrupter of claim 11, wherein the fastener is a metallic clip.

19. The circuit interrupter of claim 11, wherein said one of the plurality of busbars includes a flat portion; and wherein the insulating sleeve is structured to be in direct contact with the flat portion of said one of the plurality of busbars.

20. The circuit interrupter of claim 11, wherein the current transformer provides the harvested power to the thermal trip assembly.

21. The circuit interrupter of claim 11, wherein the electronic trip unit outputs the first trip signal to initiate an instantaneous trip and the thermal trip assembly outputs the second trip signal to initiate a temperature based trip.

22. A circuit interrupter comprising:
a first terminal;
a second terminal;
a plurality of busbars electrically connecting the first and second terminals;
separable contacts moveable between a closed position and an open position, the first and second terminals being electrically disconnected from each other when the separable contacts are in the open position;
an operating mechanism structured to open said separable contacts;
an actuator structured to cooperate with said operating mechanism to trip open said separable contacts;
a current sensor structured to sense a current flowing between the first and second terminals;
a current transformer structured to harvest power from the current flowing between the first and second terminals; and
an electronic trip unit including:
an other trip function circuit structured to output a first trip signal to control the actuator to cooperate with the operating mechanism to trip open the separable contacts based on the current sensed by the current sensor; and
a thermal trip assembly comprising:
a fastener;
an insulating sleeve;
a temperature sensor structured to sense a temperature of one of the plurality of busbars; and
a thermal trip circuit structured to output a second trip signal based on the sensed temperature,
wherein a portion of said insulating sleeve is disposed between the temperature sensor and said one of the plurality of busbars; and
wherein the fastener couples the insulating sleeve and the temperature sensor to said one of the plurality of busbars with the insulating sleeve being in direct contact with a portion of the one of the plurality of busbars;
wherein the thermal trip circuit includes:
a temperature sensing circuit structured to output a voltage based on the temperature sensed by the temperature sensor;
a differential amplifier circuit structured to amplify to an output a difference between the voltage output by the temperature sensing circuit and a first predetermined voltage;
a follower circuit structured to buffer to an output a voltage of the output of the differential amplifier circuit;
an integrator circuit structured to smooth to an output a voltage of the output of the follower circuit; and
a comparator circuit structured to compare a voltage of the output of the integrator circuit with a second predetermined voltage and to output the second trip signal when the output of the integrator circuit is greater than the second predetermined voltage.

* * * * *